US008594880B2

(12) United States Patent
Yamazaki et al.

(10) Patent No.: US 8,594,880 B2
(45) Date of Patent: Nov. 26, 2013

(54) VEHICLE BODY FLOW SUPPRESSION DEVICE

(75) Inventors: Norio Yamazaki, Utsunomiya (JP);
Shigenori Takimoto, Utsunomiya (JP);
Yoshifumi Nakamura, Utsunomiya (JP); Yoshimichi Kawamoto, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 177 days.

(21) Appl. No.: 12/989,309

(22) PCT Filed: Apr. 21, 2009

(86) PCT No.: PCT/JP2009/057912
§ 371 (c)(1),
(2), (4) Date: Oct. 22, 2010

(87) PCT Pub. No.: WO2009/131116
PCT Pub. Date: Oct. 29, 2009

(65) Prior Publication Data
US 2011/0046841 A1    Feb. 24, 2011

(30) Foreign Application Priority Data
Apr. 24, 2008  (JP) ................................. 2008-113909

(51) Int. Cl.
*G06F 7/00* (2006.01)
*B62D 6/00* (2006.01)

(52) U.S. Cl.
CPC .... *G06F 7/00* (2013.01); *B62D 6/00* (2013.01)
USPC .............. 701/31.4; 701/41; 701/42; 701/124; 180/282

(58) Field of Classification Search
USPC ................ 701/31.4, 36, 41, 42, 124; 180/282
See application file for complete search history.

(56) References Cited

U.S. PATENT DOCUMENTS 5,882,092 A * 3/1999 Koibuchi ....................... 303/146
6,304,805 B1 * 10/2001 Onogi ............................. 701/36
6,377,885 B2 * 4/2002 Yasui et al. ..................... 701/80

(Continued)

FOREIGN PATENT DOCUMENTS

CN         1695973 A       11/2005
JP    2007-062712 A        3/2007

(Continued)

OTHER PUBLICATIONS

Japanese Notice of Reasons for Rejection mailed Oct. 23, 2012, in counterpart Japanese Patent Application No. 2010-509185 (4 pages including English translation).
Chinese Office Action issued Jan. 24, 2013, in counterpart Chinese Patent Application No. 2009801141574 (9 pages including partial English translation).

*Primary Examiner* — Thomas Tarcza
*Assistant Examiner* — Tyler J Lee
(74) *Attorney, Agent, or Firm* — Arent Fox LLP

(57) ABSTRACT

A vehicle body drifting restraining device restraining a drifting of a vehicle body of a vehicle, the vehicle body drifting restraining device comprising: an activeness level determination unit determining an activeness level of a driver with respect to a movement of the vehicle in a longitudinal direction; and a vehicle body drifting restraining control permission/prohibition switch permitting or prohibiting a control restraining the drifting of the vehicle body, wherein the control restraining the drifting of the vehicle body is executed only when the activeness level determination unit determines that the activeness level is low.

6 Claims, 4 Drawing Sheets

(56) References Cited

U.S. PATENT DOCUMENTS

| | | | |
|---|---|---|---|
| 6,491,358 B2 * | 12/2002 | Soejima et al. | 303/146 |
| 6,880,899 B2 * | 4/2005 | Soejima et al. | 303/146 |
| 7,412,318 B2 * | 8/2008 | Fujioka et al. | 701/70 |
| 7,740,098 B2 * | 6/2010 | Lich et al. | 180/282 |
| 2005/0027402 A1 * | 2/2005 | Koibuchi et al. | 701/1 |
| 2007/0050112 A1 * | 3/2007 | Kroehnert et al. | 701/41 |
| 2008/0183353 A1 * | 7/2008 | Post et al. | 701/42 |
| 2009/0254249 A1 * | 10/2009 | Ghoneim et al. | 701/38 |

FOREIGN PATENT DOCUMENTS

| | | | |
|---|---|---|---|
| JP | 2007-069757 A | | 3/2007 |
| JP | 2007-168617 A | | 7/2007 |
| JP | 2007168617 A | * | 7/2007 |
| JP | 2008-105657 A | | 5/2008 |
| JP | 2008-284892 A | | 11/2008 |
| JP | 2009-126317 A | | 6/2009 |
| WO | WO 2009/131116 A | | 10/2009 |

* cited by examiner

VEHICLE BODY FLOW SUPPRESSION DEVICE

TECHNICAL FIELD

The present invention relates to a vehicle body flow suppression device (hereinafter may be referred to as a vehicle body drifting restraining device) which restrains a drifting of a vehicle body with respect to a lateral slope of a road surface.

Priority is claimed on Japanese Patent Application No. 2008-113909, filed Apr. 24, 2008, the content of which is incorporated herein by reference.

BACKGROUND ART

To enable safe driving during rain, some roads have lateral slopes on their surface so that rain will not accumulate on the road surface. When a vehicle is running on such a road that has a lateral slope, the vehicle drifts towards a lower portion of the road surface. Hereinafter, this phenomenon will be called "vehicle body drifting."

When vehicle body drifting occurs in this way, a driver's burden of driving the vehicle increases because the driver is forced to adjust the operation of the vehicle by using a steering wheel in order to drive straight without having the vehicle drift towards the lower portion of the road surface.

Consequently, vehicle body drifting restraining devices have been developed, which restrain the drifting of the vehicle body while reducing the driver's burden of driving the vehicle. For example, an electric-powered steering device is known, which increases the control of a steering assist amount when vehicle body drifting is detected, compared to when vehicle body drifting has not occurred (for example, refer to Japanese Unexamined Patent Application, First Publication No. 2007-168617).

DISCLOSURE OF INVENTION

However, there is a problem in that, when a vehicle body drifting restraining device restrains the drifting of a vehicle body while a driver wishes to drive and operate the vehicle in a highly proactive manner, the driver's operation of the vehicle and the restraining of vehicle body drifting interfere with one another, thereby worsening the steering feel.

Consequently, an object of the present invention is to provide a vehicle drifting restraining device that is capable of refraining from performing the control of restraining vehicle body drifting when it is presumed that the driver does not want vehicle body drifting to be restrained.

In order to solve the above problem, a vehicle body drifting restraining device according to the present invention employs the following configuration:

(1) An aspect of the present invention is a vehicle body drifting restraining device restraining a drifting of a vehicle body of a vehicle. The vehicle body drifting restraining device includes: an activeness level determination unit determining an activeness level of a driver with respect to a movement of the vehicle in a longitudinal direction; and a vehicle body drifting restraining control permission/prohibition switch permitting or prohibiting a control restraining the drifting of the vehicle body, wherein the control restraining the drifting of the vehicle body is executed only when the activeness level determination unit determines that the activeness level is low.

According to this configuration, when the activeness level of the driver with respect to the movement of the vehicle in the longitudinal direction, detected by the activeness level determination unit, is low, it is possible to presume that the driver wants the control restraining the drifting of the vehicle body (hereinafter may be referred to as a vehicle body drifting restraining control) to be executed. Further, when the activeness level of the driver is high, it is possible to presume that the driver does not want the vehicle body drifting restraining control to be executed. Further, since the vehicle body drifting restraining control is performed only when the activeness level of the driver is determined to be low, it is possible to prevent the vehicle body drifting restraining control from being executed when the activeness level of the driver is determined to be high.

(2) In addition, the vehicle body drifting restraining device may be configured as follows: the vehicle body drifting restraining device further includes a longitudinal acceleration detection unit detecting an acceleration of the vehicle in a longitudinal direction. Here, the activeness level determination unit determines that the activeness level of the driver is low when the acceleration of the vehicle in the longitudinal direction, detected by the longitudinal acceleration detection unit, is less than a predetermined value.

According to this configuration, it is possible to determine the activeness level of the driver with respect to the movement of the vehicle in the longitudinal direction easily and appropriately.

(3) In addition, the vehicle body drifting restraining device may be configured as follows: the vehicle body drifting restraining device further includes an accelerator opening detection unit detecting an accelerator opening of the vehicle. Here, the activeness level determination unit determines that the activeness level of the driver is low when, either the accelerator opening detected by the accelerator opening detection unit is less than a predetermined value, or, a temporal change in the accelerator opening is less than a predetermined value.

According to this configuration, it is possible to determine the activeness level of the driver with respect to the movement of the vehicle in the longitudinal direction easily and appropriately.

(4) In addition, the vehicle body drifting restraining device may be configured as follows: the control restraining the drifting of the vehicle body restrains the drifting of the vehicle body with respect to a lateral slope of a road surface.

(5) In addition, the vehicle body drifting restraining device may be configured as follows: the control restraining the drifting of the vehicle body prevents the vehicle body from drifting towards a lower portion of a road surface.

(6) In addition, the vehicle body drifting restraining device may be configured as follows: the control restraining the drifting of the vehicle body is executed based on a steering torque of the vehicle running straight.

(7) In addition, the vehicle body drifting restraining device may be configured as follows: the vehicle body drifting restraining device further includes a vehicle behavior determination unit determining a behavior of the vehicle; and a driver performance determination unit determining a driver performance of the vehicle. Here, whether or not the vehicle is running straight is determined based on a determination result of the vehicle behavior determination unit and the driver performance determination unit.

According to an embodiment according to (1) above, when the activeness level of the driver is low, it may be presumed that the driver wants the vehicle body drifting restraining control to be performed, and the vehicle body drifting restraining control may be executed only in this case. Further, when the activeness level of the driver is high, it may be presumed that the driver does not want the vehicle body drifting restraining control to be performed, and thus the vehicle body drifting restraining control may be prevented from being performed. Therefore, the level of participation of the driver to the driving operation may be altered according to the driver. Moreover, it is possible to prevent the interference between the driver's operation of the vehicle and the restraining of vehicle body drifting, thus improving the steering feel.

According to an embodiment according to (2) and (3) above, it is possible to determine the activeness level of the driver with respect to the movement of the vehicle in the longitudinal direction easily and appropriately.

BEST MODE FOR CARRYING OUT THE INVENTION

<First Embodiment>

Hereunder, a first embodiment of the vehicle body drifting restraining device according to the present invention is described with reference to the drawings of FIG. 1 to FIG. 5.

Figure 1:
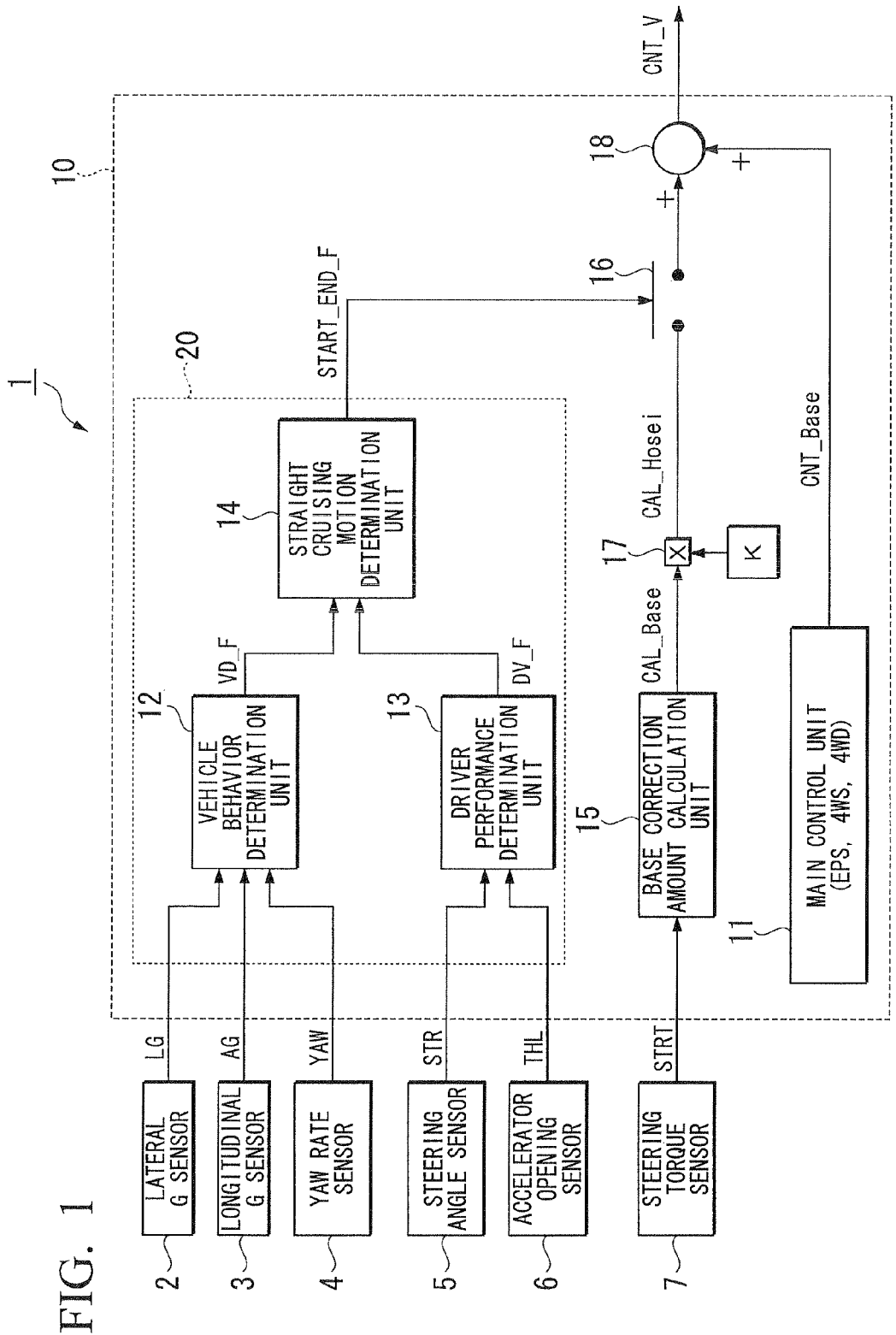
FIG. 1 is a block diagram in a first embodiment of a vehicle body drifting restraining device according to the present invention.

As shown in the block diagram in FIG. 1, the vehicle body drifting restraining device 1 includes a lateral acceleration sensor (hereinafter referred to as lateral G sensor) 2 that detects a vehicle's acceleration in the left-right direction (hereinafter referred to as lateral acceleration), a longitudinal acceleration sensor (hereinafter referred to as longitudinal G sensor) 3 that detects a vehicle's acceleration in the front-back direction (hereinafter referred to as longitudinal acceleration), a yaw rate sensor 4 that detects a vehicle's yaw rate, a steering angle sensor 5 that detects a steering angle of a vehicle's steering shaft, an accelerator opening sensor 6 that detects an accelerator opening of a vehicle's accelerator, a steering torque sensor 7 that detects a steering torque that is applied to a steering shaft, and an electronic control device (ECU) 10.

The lateral G sensor 2, the longitudinal G sensor 3, the yaw rate sensor 4, the steering angle sensor 5, the accelerator opening sensor 6, and the steering torque sensor 7 output respectively an output signal LG, AG, YAW, STR, THL, and STRT to the ECU 10 according to detected values.

The ECU 10 includes a main control unit 11, a vehicle behavior determination unit 12, a driver performance determination unit 13, a straight cruising motion determination unit 14, a base correction amount calculation unit 15, and a vehicle body drifting restraining control ON/OFF switch (a vehicle body drifting restraining control permission/prohibition switch) 16, etc.

The main control unit 11 is a control unit that is executed regardless of whether or not the vehicle body drifting restraining control is performed. The main control unit 11 controls elements that can change a vehicle's yaw angle. When the vehicle body drifting restraining control is performed, the drifting of the vehicle body is restrained by correcting a base control amount (CNT_Base) which is outputted from this main control unit 11.

For example, the main control unit 11 can be configured as a steering assist control at an electrical power steering device (hereinafter referred to as EPS), and a base control amount (CNT_Base) in this case becomes a target steering assist torque. Alternatively, the main control unit 11 can be configured as a rear rudder angle control at a four-wheeled steering device (hereinafter referred to as 4WS), and a base control amount (CNT_Base) in this case becomes a target rear rudder angle. Alternatively, the main control unit 11 can be configured as a driving torque control at a four-wheeled driving device (hereinafter referred to as 4WD), and a base control amount (CNT_Base) in this case becomes a target right/left driving torque.

The vehicle behavior determination unit 12 determines a vehicle's behavior based on output signals by the lateral G sensor 2, the longitudinal G sensor 3, and the yaw rate sensor 4. Describing this feature in more detail, the vehicle behavior determination unit 12 determines how straight a vehicle is running based on output signals by the lateral G sensor 2 and the yaw rate sensor 4, and determines whether or not a vehicle is in cruising motion based on an output signal by the longitudinal G sensor 3.

Describing this feature in more detail, when the absolute value of a lateral acceleration LG detected by the lateral G sensor 2 is less than a predetermined value A (m/s$^2$), and, when the absolute value of a yaw rate YAW detected by the yaw rate sensor 4 is less than a predetermined value B (rad/s), the vehicle behavior determination unit 12 determines that the vehicle is running straight. When the absolute value of a lateral acceleration LG is greater than or equal to the predetermined value A (m/s$^2$), or when the absolute value of a yaw rate YAW is greater than or equal to the predetermined value B (rad/s), the vehicle behavior determination unit 12 determines that the vehicle is not running straight.

In addition, when the absolute value of a longitudinal acceleration AG detected by the longitudinal G sensor 3 is less than a predetermined value C (m/s$^2$), the vehicle behavior determination unit 12 determines that the vehicle is in cruising motion. When the absolute value of a longitudinal acceleration AG is greater than or equal to the predetermined value C (m/s$^2$), the vehicle behavior determination unit 12 determines that the vehicle is not in cruising motion.

It can be said that, while a vehicle is in cruising motion, the degree of a driver's activity with respect to the vehicle's longitudinal movement is low, and while a vehicle is not in cruising motion, the degree of a driver's activity with respect to the vehicle's longitudinal movement is high. In other words, the vehicle behavior determination unit 12 determines the level of a driver's activity with respect to a vehicle's longitudinal movement based on a longitudinal acceleration detected by the longitudinal G sensor 3.

Furthermore, when the absolute value of a lateral acceleration LG is less than a predetermined value A (m/s$^2$), and, when the absolute value of a yaw rate YAW is less than a predetermined value B (rad/s), and, when the absolute value of a longitudinal acceleration AG is less than a predetermined value C (m/s$^2$), the vehicle behavior determination unit 12 determines that the vehicle is in straight cruising motion (running steadily), and sets a straight cruising motion flag VD_F equal to "1." When the absolute value of a lateral acceleration LG is greater than or equal to the predetermined value A (m/s$^2$), or, when the absolute value of a yaw rate YAW detected by the yaw rate sensor 4 is greater than or equal to the predetermined value B (rad/s), or, when the absolute value of a longitudinal acceleration AG detected by the longitudinal G sensor 3 is greater than or equal to the predetermined value C (m/s$^2$), the vehicle behavior determination unit 12 determines that the vehicle is not in straight cruising motion, and sets the straight cruising motion flag VD_F equal to "0." Further, the vehicle behavior determination unit 12 outputs the straight cruising motion flag VD_F signal to the straight cruising motion determination unit 14.

Figure 3:
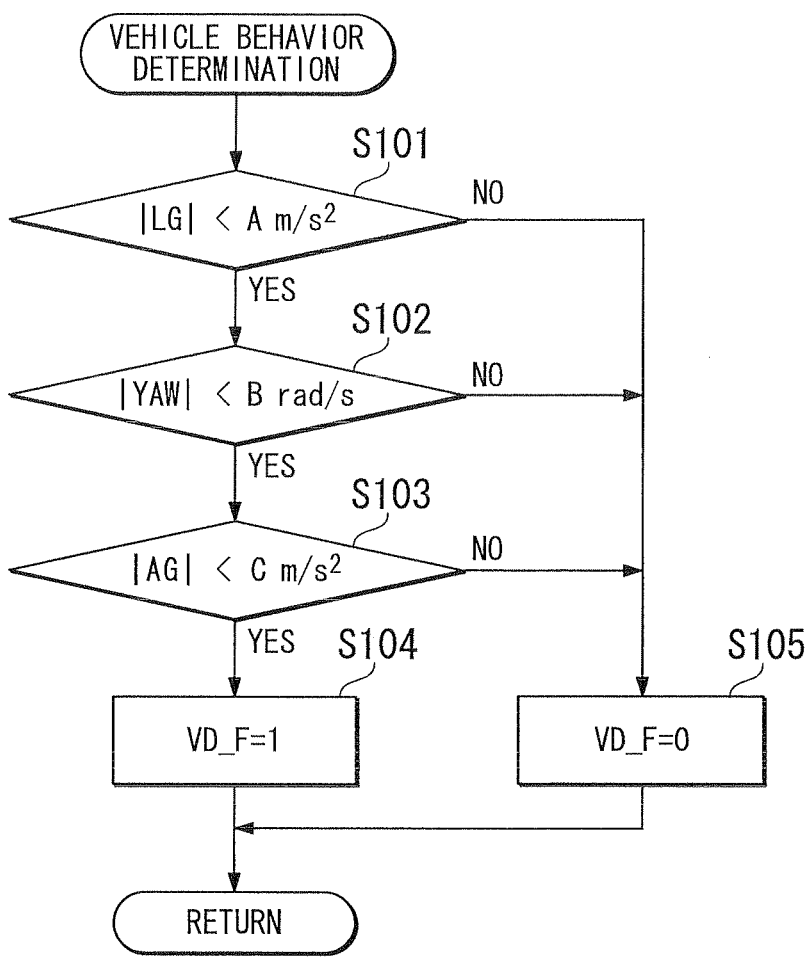
FIG. 3 is a flowchart showing a processing for determining a vehicle's behavior according to the vehicle body drifting restraining control.

The flowchart in FIG. 3 shows the routine for processing the determination of vehicle behavior, which is executed at the vehicle behavior determination unit 12. The routine for processing the determination of vehicle behavior is performed repeatedly by the ECU 10.

First, in step S101, it is determined whether or not the absolute value of the lateral acceleration LG detected by the lateral G sensor 2 is less than a predetermined value A (m/s$^2$).

If the result of step S101 is "YES" (|LG|<A), the routine proceeds to step S102, and determines whether or not the absolute value of the yaw rate YAW detected by the yaw rate sensor 4 is less than a predetermined value B (rad/s).

If the result of step S102 is "YES" (|YAW|<B), the routine proceeds to step S103, and determines whether or not the absolute value of the longitudinal acceleration AG detected by the longitudinal G sensor 3 is less than a predetermine value C (m/s$^2$).

If the result of step S103 is "YES" (|AG|<C), the routine proceeds to step S104, sets the straight cruising motion flag VD_F equal to "1," and returns this value.

On the other hand, if the result of step S101 is "NO" (|LG|≥A), the result of step S102 is "NO" (|YAW|≥B), and the result of step S103 is "NO" (|AG|≥C), the routine proceeds to step S105, sets the straight cruising motion flag VD_F equal to "0," and returns this value.

The driver performance determination unit 13 determines the state of driving based on output signals from the steering angle sensor 5 and the accelerator opening sensor 6. Describing this feature in more detail, it is determined whether or not the vehicle is operated to run straight, based on the output signal by the steering angle sensor 5. It is also determined whether or not the vehicle is in cruising operation based on the output signal by the accelerator opening sensor 6.

Describing this feature in more detail, when the absolute value of the steering angle STR detected by the steering angle sensor 5 is less than a predetermined value D (rad), it is determined that the vehicle is operated to run straight. When the absolute value of the steering angle STR is greater than or equal to the predetermined value D (rad), it is determined that the vehicle is not operated to run straight.

In addition, when the accelerator opening THL detected by the accelerator opening sensor 6 is less than a predetermined value F (rad), it is determined that the vehicle is in a cruising mode of operation. When the accelerator opening THL is greater than or equal to the predetermined value F (rad), it is determined that the vehicle is not in a cruising mode of operation.

It can be said that, while a vehicle is in a cruising mode of operation, the degree of a driver's activity with respect to the vehicle's longitudinal movement is low; whereas while a vehicle is not in a cruising mode of operation, the degree of a driver's activity with respect to the vehicle's longitudinal movement is high. In other words, the driver performance determination unit 13 determines the level of a driver's activity with respect to a vehicle's longitudinal movement based on the accelerator opening detected by the accelerator opening sensor 6.

It is also possible to determine the degree of a driver's activity with respect to the vehicle's longitudinal movement based on the temporal change of the accelerator opening, namely, the accelerator opening velocity. It can be determined that, when the accelerator opening velocity is small, the degree of a driver's activity is low; whereas when the accelerator opening velocity is large, the degree of a driver's activity is high.

Furthermore, when the absolute value of the steering angle STR is less than a predetermined value D (rad) and the accelerator opening THL is less than a predetermined value F (rad), the driver performance determination unit 13 determines that the vehicle is in a straight cruising mode of operation, and sets the straight cruising operation flag DV_F equal to "1." When the absolute value of the steering angle STR is greater than or equal to the predetermined value D (rad), or, when the accelerator opening THL is greater than or equal to the predetermined value F, the driver performance determination unit 13 determines that the vehicle is not in a straight cruising mode of operation, and sets the straight cruising operation flag DV_F equal to "0." Further, the driver performance determination unit 13 outputs the straight cruising operation flag DV_F signal to the straight cruising motion determination unit 14.

Figure 4:
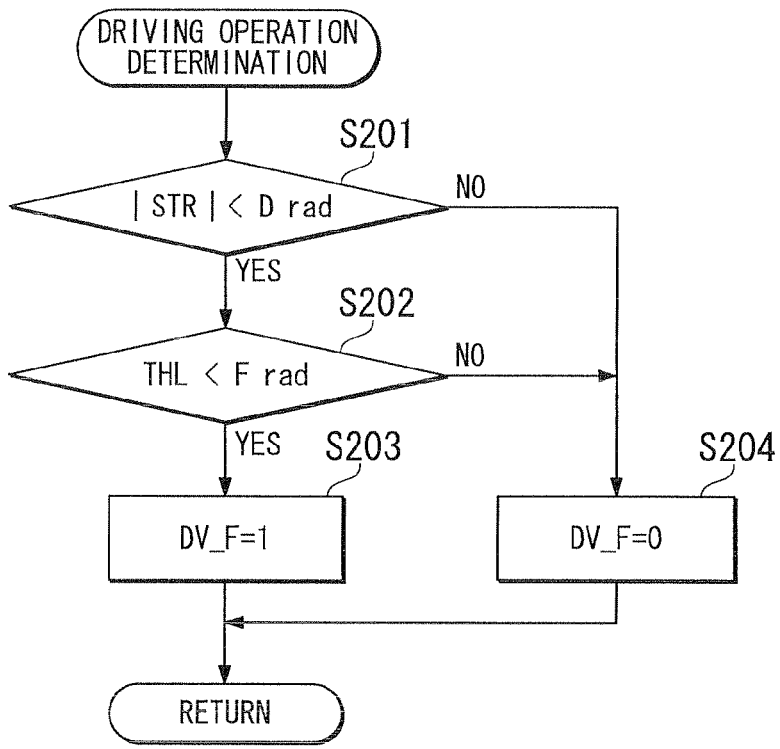
FIG. 4 is a flowchart showing a processing for determining a driving operation according to the vehicle body drifting restraining control.

The flowchart in FIG. 4 shows the routine for processing the determination of driver performance, which is executed at the driver performance determination unit 13. The routine for processing the determination of driver performance is executed repeatedly by the ECU 10.

First, in step S201, it is determined whether or not the absolute value of the steering angle STR detected by the steering angle sensor 5 is less than a predetermined value D (rad).

If the result of step S201 is "YES" (|STR|<D), the routine proceeds to step S202, and determines whether or not the accelerator opening THL detected by the accelerator opening sensor 6 is less than a predetermined value F (rad).

If the result of step S202 is "YES" (THL<F), the routine proceeds to step S203, sets the straight cruising operation flag DV_F equal to "1," and returns this value.

On the other hand, if the result of step S201 is "NO" (|STR|≥D), and the result of step S202 is "NO" (THL≥F), the routine proceeds to step S204, sets the straight cruising operation flag DV_F equal to "0," and returns this value.

The straight cruising motion determination unit 14 determines whether or not to turn on the vehicle body drifting restraining control ON/OFF switch (to start the control) or to turn off the vehicle body drifting restraining control ON/OFF switch (to end the control), based on the straight cruising motion flag VD_F signal inputted from the vehicle behavior determination unit 12 and the straight cruising operation flag DV_F signal inputted from the driver performance determination unit 13.

Describing this feature in more detail, when the straight cruising motion flag VD_F and the straight cruising operation flag DV_F are both "1," the straight cruising motion determination unit 14 determines that the car is in a straight cruising motion/operation. At the same time, the straight cruising motion determination unit 14 determines that the degree of a driver's activity with respect to the vehicle's longitudinal movement is low, and determines that driver wants the vehicle body drifting restraining control to be performed. Further, the straight cruising motion determination unit 14 sets the control start-end flag START_END_F to "1," and turns on the vehicle body drifting restraining control ON/OFF switch 16.

Meanwhile, when the straight cruising motion flag VD_F is "0," the vehicle is not running in a straight cruising motion.

Further, when the straight cruising operation flag DV_F is "0," the vehicle is not under a straight cruising driving operation. In both of these cases, the straight cruising motion determination unit 14 determines that the degree of a driver's activity with respect to the vehicle's longitudinal movement is high, and also determines that the driver does not want the vehicle body drifting restraining control to be performed. Further, the straight cruising motion determination unit 14 sets the control start-end flag START_END_F to "0," and turns off the vehicle body drifting restraining control ON/OFF switch 16.

An activeness level determination unit 20 (the activeness level determination unit) determines the degree of a driver's activity with respect to the vehicle's longitudinal movement. This activeness level determination unit 20 (the activeness level determination unit) includes the vehicle behavior determination unit 12, the driver performance determination unit 13, and the straight cruising motion determination unit 14.

Figure 5:
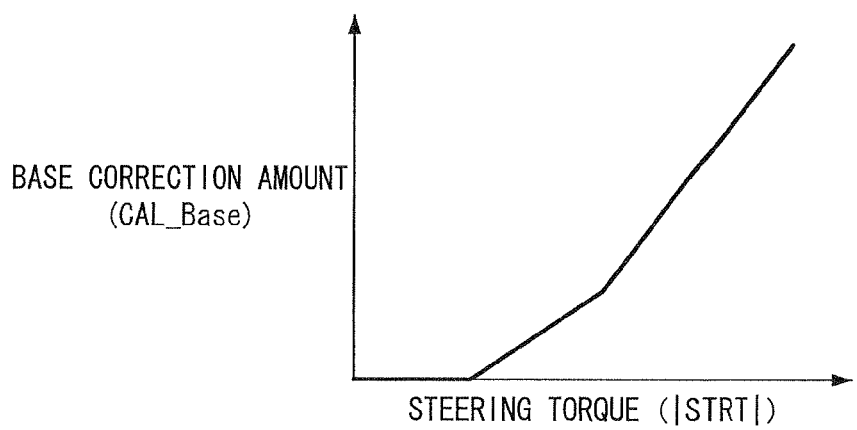
FIG. 5 is an example of a base correction amount table that is used according to the vehicle body drifting restraining control.

The base correction amount calculation unit 15 calculates a base correction amount CAL_Base based on an output signal (steering torque STRT) of the steering torque sensor 7, and by referring to the base correction amount table shown in FIG. 5 for example. In the base correction amount table shown in FIG. 5, the horizontal axis represents the absolute value of the steering torque, the vertical axis represents the base correction amount CAL_Base. The base correction amount CAL_Base is "0" when the absolute value of the steering torque is less than or equal to a predetermined value. When the absolute value of the steering torque becomes greater than or equal to the predetermined value, the base correction amount CAL_Base is set up to increase gradually as the absolute value of the steering torque increases. In other words, the correction amount for the vehicle body drifting restraining control is set to increase as the steering torque detected by the steering torque sensor 7 increases.

The base correction amount CAL_Base calculated by the base correction amount calculation unit 15 is entered into a multiplier 17, multiplied by a coefficient K by the multiplier 17, and thus the correction amount CAL_Hosei is calculated (CAL_Hosei=CAL_Base×K). Here, the coefficient K is a conversion coefficient that is determined by what the main control unit 11 is controlling. When the main control unit 11 is configured as a steering assist control in an EPS, a steering torque conversion coefficient K1 is used. When the main control unit 11 is configured as a rear rudder angle control in a 4WS, a rudder angle conversion coefficient K2 is used. When the main control unit 11 is configured as a driving torque control in a 4WD, a driving torque conversion coefficient K3 is used.

Furthermore, when the vehicle body drifting restraining control ON/OFF switch 16 is turned ON, the base control amount CNT_Base of the main control unit 11 entered into the adder 18 is added to the correction amount CAL_Hosei which is also entered into the adder 18. Thus, the control value CNT_V of the main control unit 11 is calculated and is outputted to a driver circuit that is not diagramed (CNT_V=CNT_Base+CAL_Hosei).

In addition, when the vehicle body drifting restraining control ON/OFF switch 16 is turned OFF, the correction amount CAL_Hosei is not entered into the adder 18, and only the base control amount CNT_Base of the main control unit 11 is entered. Therefore, the base control amount CNT_Base is outputted as the control amount CNT_V of the main control unit 11 (CNT_V=CNT_Base). Thus, in this case, the correction amount CAL_Hosei becomes "0" (CAL_Hosei=0).

Figure 2:
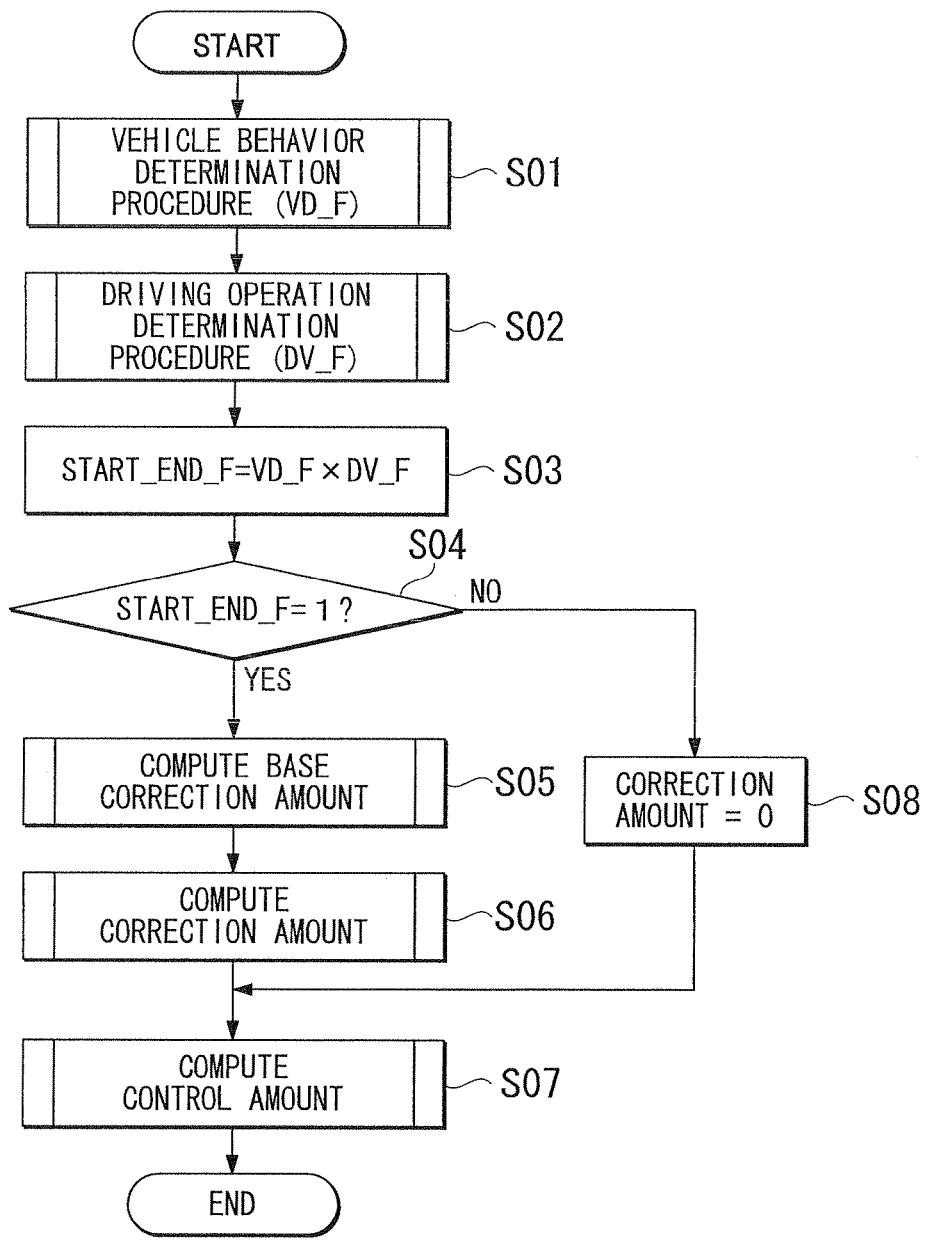
FIG. 2 is a flowchart showing a vehicle body drifting restraining control according to the vehicle body drifting restraining device.

Next, a vehicle body drifting restraining control according to the present embodiment is described according to the flowchart shown in FIG. 2.

The routine for vehicle body drifting restraining control, shown in the flowchart in FIG. 2, is executed repeatedly at regular time intervals by the ECU 10.

First, in step S01, based on the output signals by the lateral G sensor 2, the longitudinal G sensor 3, and the yaw rate sensor 4, the processing for determining vehicle behavior, described earlier, is carried out, and the straight cruising motion flag VD_F is set to either "1" or "0."

Next, the routine proceeds to step S02, and based on the output signals by the steering angle sensor 5 and the accelerator opening sensor 6, the processing for determining driver performance, described earlier, is carried out. Further, the straight cruising operation flag DV_F is set to either "1" or "0."

Next, the routine proceeds to step S03, and after multiplying the straight cruising motion flag VD_F and the straight cruising operation flag DV_F, the resulting product is set as the control start-end flag START_END_F (START_END_F=VD_F×DV_F).

Next, the routine proceeds to step S04, and determines whether or not the control start-end flag START_END_F is "1."

If the result of step S04 is "YES" (START_END_F=1), the routine proceeds to step S05 and calculates the base correction amount CAL_Base according to the output signal of the steering torque sensor 7.

Next, the routine proceeds to step S06, multiplies the base correction amount CAL_Base by the coefficient K, and calculates the correction amount CAL_Hosei (CAL_Hosei=CAL_Base×K).

Next, the routine proceeds to step S07, adds the base control amount CNT_Base of the main control unit 11 to the correction amount CAL_Hosei, and calculates the control amount CNT_V of the main control unit 11 (CNT_V=CNT_Base+CAL_Hosei).

On the other hand, if the result of step S04 is "NO" (START_END_F=0), the routine proceeds to step S08, sets the correction amount CAL_Hosei to "0," and proceeds to step S07. In this case, because "0" is added to the base control amount CNT_Base of the main control unit 11 as the correction amount CAL_Hosei, the control amount CNT_V of the main control unit 11 becomes equal to the base control amount CNT_Base (CNT_V=CNT_Base).

As described above, according to the vehicle body drifting restraining device 1 according to the first embodiment, when the activeness level determination unit 20 determines that the degree of a driver's activity with respect to the vehicle's longitudinal movement is low, the activeness level determination unit 20 determines that the deriver wants the vehicle body drifting restraining control to be performed. Only in this case, the vehicle body drifting restraining control is performed. Therefore, when the degree of a driver's activity with respect to the vehicle's longitudinal movement is determined to be high, it is possible to prevent the vehicle body drifting restraining control from being controlled. As a result, it is possible to change the degree of the driver's participation in the operation of the vehicle according to the driver. Thus, it is possible to prevent the interference between the driver's operation of the vehicle and the restraining of vehicle body drifting, thus improving the steering feel.

<Other Embodiments>

The present invention is not limited to description provided above with respect to the First Embodiment.

For example, according to the First Embodiment described above, the vehicle body drifting restraining control is performed only when the level of activeness of the driver determined based on the longitudinal acceleration detected by the longitudinal G sensor 3 and the level of activeness of the driver determined based on the acceleration opening (or the acceleration opening velocity) detected by the accelerator opening sensor 6 are both low. However, the present invention is not limited to this configuration. According to the present invention, the vehicle body drifting restraining control may be performed when at least either one of the following is low: the level of the driver's activeness determined based on the longitudinal acceleration detected by the longitudinal G sensor 3 or the level of the driver's activeness determined based on the acceleration opening detected by the acceleration opening sensor 6.

INDUSTRIAL APPLICABILITY

According to the present invention, when the level of a driver's activeness is low, it is presumed that the driver wants the vehicle body drifting restraining control to be performed, an only in this instance, the vehicle body drifting restraining control may be performed. Further, when the level of a driver's activeness is high, it is presumed that the driver does not want the vehicle body drifting restraining control to be performed, and thus the vehicle body drifting restraining control may be prevented from being performed. Therefore, it is possible to alter the degree with which the driver participates in the driving of the vehicle according to the driver. Further, it is possible to prevent the interference between the driver's operation of the vehicle and the restraining of vehicle body drifting, thus improving the steering feel.

DESCRIPTION OF REFERENCE NUMERALS

1 vehicle body drifting restraining device
2 lateral G sensor (lateral acceleration detection unit)
3 longitudinal G sensor (longitudinal acceleration detection unit)
4 yaw rate sensor (yaw rate detection unit)
5 steering angle sensor (steering angle detection unit)
6 accelerator opening sensor (accelerator opening detection unit)
7 steering torque sensor (steering torque detection unit)
10 electronic control device (ECU)
11 main control unit
12 vehicle behavior determination unit
13 driver performance determination unit
14 straight cruising motion determination unit
15 base correction amount calculation unit
16 vehicle body drifting restraining control ON/OFF switch (a vehicle body drifting restraining control permission/prohibition switch)
17 multiplier
18 adder
20 activeness level determination unit

The invention claimed is:

1. A vehicle body drifting restraining device restraining a drifting of a vehicle body of a vehicle, the vehicle body drifting restraining device comprising:
   an activeness level determination unit determining an activeness level of a driver with respect to a movement of the vehicle in a longitudinal direction; and
   a vehicle body drifting restraining control permission/prohibition switch permitting or prohibiting a control restraining the drifting of the vehicle body, wherein
   the control restraining the drifting of the vehicle body is executed only when the activeness level determination unit determines that the activeness level is low,
   the control restraining the drifting of the vehicle body restrains the drifting of the vehicle body with respect to a lateral slope of a road surface,
   the control restraining the drifting of the vehicle body prevents the vehicle body from drifting towards a lower portion of a road surface, and
   the control restraining the drifting of the vehicle body is executed based on a steering torque of the vehicle running straight.

2. The vehicle body drifting restraining device according to claim 1, further comprising:
   a longitudinal acceleration detection unit detecting an acceleration of the vehicle in a longitudinal direction, wherein
   the activeness level determination unit determines that the activeness level of the driver is low when the acceleration of the vehicle in the longitudinal direction, detected by the longitudinal acceleration detection unit, is less than a predetermined value.

3. The vehicle body drifting restraining device according to claim 1, further comprising:
   an accelerator opening detection unit detecting an accelerator opening of the vehicle, wherein
   the activeness level determination unit determines that the activeness level of the driver is low when, either the accelerator opening detected by the accelerator opening detection unit is less than a predetermined value, or, a temporal change in the accelerator opening is less than a predetermined value.

4. The vehicle body drifting restraining device according to claim 1, further comprising:
   a vehicle behavior determination unit determining a behavior of the vehicle; and a driver performance determination unit determining a driver performance of the vehicle, wherein
   whether or not the vehicle is running straight is determined based on a determination result of the vehicle behavior determination unit and the driver performance determination unit.

5. The vehicle drifting restraining device according to claim 1, further comprising;
   a vehicle behavior determination unit determining a behavior of the vehicle,
   wherein the activeness level determination unit further determines the activeness level of a driver based on the determined behavior of the vehicle.

6. The vehicle drifting restraining device according to claim 5, wherein when the determined behavior of the vehicle is a cruising motion, the activeness level of the driver is determined to be low.

* * * * *